US010363966B2

(12) United States Patent
Ando et al.

(10) Patent No.: US 10,363,966 B2
(45) Date of Patent: Jul. 30, 2019

(54) VEHICLE SIDE STRUCTURE (71) Applicant: Toyota Jidosha Kabushiki Kaisha, Toyota-shi Aichi-ken (JP)

(72) Inventors: Takahiro Ando, Okazaki (JP); Hisashi Misawa, Toyota (JP)

(73) Assignee: Toyota Jidosha Kabushiki Kaisha, Toyota-shi Aichi-ken (JP)

( * ) Notice: Subject to any disclaimer, the term of this patent is extended or adjusted under 35 U.S.C. 154(b) by 0 days.

(21) Appl. No.: 15/840,231

(22) Filed: Dec. 13, 2017

(65) Prior Publication Data
US 2018/0170441 A1 Jun. 21, 2018

(30) Foreign Application Priority Data

Dec. 19, 2016 (JP) ................................. 2016-245818

(51) Int. Cl.
*B62D 21/15* (2006.01)
*B62D 27/02* (2006.01)
*B62D 25/04* (2006.01)

(52) U.S. Cl.
CPC ........... *B62D 21/157* (2013.01); *B62D 25/04* (2013.01); *B62D 27/023* (2013.01)

(58) Field of Classification Search
CPC .......................... B62D 21/157; B62D 27/023
USPC ....................................... 296/187.12, 193.06
See application file for complete search history.

(56) References Cited

U.S. PATENT DOCUMENTS

| 2011/0304175 | A1  | 12/2011 | Mori  |              |
|--------------|-----|---------|-------|--------------|
| 2014/0354009 | A1* | 12/2014 | Honda | B62D 25/04   |
|              |     |         |       | 296/187.12   |
| 2015/0115654 | A1* | 4/2015  | Honda | B62D 29/002  |
|              |     |         |       | 296/187.12   |
| 2015/0183466 | A1* | 7/2015  | Jung  | B62D 25/04   |
|              |     |         |       | 296/187.12   |

FOREIGN PATENT DOCUMENTS

| JP | H10258768   | A  | 9/1998  |
| JP | 2005-153820 | A  | 6/2005  |
| JP | 2013-233838 | A  | 11/2013 |
| WO | 2010/100717 | A1 | 9/2010  |
| WO | 2015/071412 | A1 | 5/2015  |

OTHER PUBLICATIONS

U.S. Appl. No. 15/824,652, filed Nov. 28, 2017; Inventor: Kentaro Saito.

* cited by examiner

Primary Examiner — Joseph D. Pape
(74) Attorney, Agent, or Firm — Dinsmore & Shohl LLP (57) ABSTRACT A front side wall portion and a rear side wall portion extend inwardly in a vehicle width direction from respective edges of an outer wall portion of a pillar outer member in a vehicle front-rear direction. Flange portions extend outwardly in the vehicle front-rear direction from respective edges of the front side wall portion and the rear side wall portion in the vehicle width direction. The outer wall portion is constituted by a flat portion placed in a central part in the vehicle front-rear direction, a front ridge portion placed on a front side relative a the flat portion in the vehicle front-rear direction, and a rear ridge portion placed on a rear side relative to the flat portion in the vehicle front-rear direction. The front side wall portion and the rear side wall portion bend in the middle in the vehicle width direction.

8 Claims, 5 Drawing Sheets

VEHICLE SIDE STRUCTURE

CROSS-REFERENCE TO RELATED APPLICATIONS

This application claims priority to Japanese Patent Application No. 2016-245818 filed on Dec. 19, 2016, which is incorporated by reference in its entirety.

BACKGROUND

1. Technical Field

This disclosure relates to a vehicle side structure.

2. Description of Related Art

A vehicle side structure described in International Publication No. 2010/100717 includes a pillar outer member extending from a lower side of a vehicle toward an upper side thereof, and a pillar inner member placed opposite to an inner side of the pillar outer member in a vehicle width direction. Further, in the vehicle side structure described in International Publication No. 2010/100717, the pillar outer member includes a plate-shaped outer wall portion opposed to the pillar inner member. A side wall portion extends inwardly in the vehicle width direction from each edge of the outer wall portion in a vehicle front-rear direction. A flange portion extends outwardly in the vehicle front-rear direction from an inner edge of the side wall portion in the vehicle width direction. An inner surface of the flange portion in the vehicle width direction is fixed to the pillar inner member by welding.

SUMMARY

When a load is applied to the vehicle side structure described in International Publication No. 2010/100717 in the vehicle width direction, the load is also transmitted to the flange portion, which a fixing part to the pillar inner member, through the outer wall portion and the side wall portion of the pillar outer member. Depending on a magnitude of the load to be applied to the pillar outer member and a direction of the load, the load concentrates on a welding part between the flange portion of the pillar outer member and the pillar inner member, so that its weld breaks, which might result in that an impact cannot be absorbed appropriately. On that account, the vehicle side structure described in International Publication No. 2010/100717 still has room for improvement in absorption of impact energy in the vehicle side portion.

A vehicle side structure according to a first aspect of this disclosure includes: a pillar inner member provided so as to extend toward an upper portion of a vehicle in a vehicle up-down direction; and a pillar outer member placed opposite to an outer side of the pillar inner member the pillar outer member including an outer wall portion having a plate shape, opposed to the pillar inner member and provided so as to extend toward the upper portion of the vehicle in the vehicle up-down direction, a front side wall portion provided so as to extend inwardly in a vehicle width direction from an edge of the outer wall portion on a vehicle front side, a rear side wall portion provided so as to extend inwardly in the vehicle width direction from an edge of the outer wall portion on a vehicle rear side, front flange portion provided so as to extend forward in a vehicle from rear direction from an inner edge of the front side wall portion in the vehicle width direction and configured such that an inner surface of the front flange portion in the vehicle width direction is fixed to the pillar inner member, and a rear flange portion provided so as to extend rearward in the vehicle front-rear direction from an inner edge of the rear side wall portion in the vehicle width direction and configured such that an inner surface of the rear flange portion in the vehicle width direction is fixed to the pillar inner member wherein: at least one of a condition (i) or a condition (ii) is satisfied, (i) a yield strength of a boundary between the outer wall portion and the front side wall portion with respect is a lateral load applied to the outer wall portion at a right angle from outside in the width direction is higher than a yield strength of the front side wall portion with respect to the lateral load, (ii) a yield strength of a boundary between the outer wall portion and the rear side wall portion with respect to the lateral load is higher than a yield strength of the rear side wall portion with respect to the lateral load.

According to the above aspect, the yield strength of the boundary between the outer wall pardon and the front side wall portion or the yield strength of the boundary between the outer wall portion and the roar side wall portion is high, and such a boundary having a yield strength can hardly deform. Accordingly, at the time when a load is applied to the pillar outer member from outside in the vehicle width direction, the load is easily applied in a concentrated manner to a side wall portion out of the front side wall portion or the rear side wall portion, the side wall portion having a yield strength lower than the yield strength of the boundary with respect to the outer wall portion, so that the side wall portion deforms first. When the side wall portion starts deforming once, the load thus applied to the pillar outer member is consumed by the deformation of the side wall portion. Accordingly, it is possible to restrain the load from excessively concentrating on the flange portion of the pillar outer member, where a weld with the pillar inner member exists. As a result, it is possible to restrain breakage of a weld in the flange portion.

In the above aspect, both of the condition (i) and the condition (ii) may be satisfied.

According to the above aspect, the yield strength of the boundary between the outer wall portion and the front side wall portion and the yield strength of the boundary between the outer wall portion and the rear side wall portion are high, so that those boundaries can hardly deform. Accordingly, when a load is applied to the pillar outer member from outside in the vehicle width direction, the load is easily applied in a concentrated manner to the front side wall portion and the rear side wall portion, which have a low yield strength, and those side wall portions deform first. When those side wall portions start deforming once, the load can hardly be transmitted to the flange portions of the pillar outer member via respective side wall portions, so that the load thus applied to the pillar outer member is consumed by the deformations of the side wall portions. Accordingly, it is possible to restrain the load from excessively concentrating on the flange portions of the pillar outer member, where welds with the pillar inner member exist. As a result, it is possible to restrain breakage of welds in the flange portions.

In the above aspect, the pillar outer member may include at least one of a front reinforcing portion configured to reinforce the boundary between the outer wall portion and the front side wall portion, or a rear reinforcing portion configured to reinforce the boundary between the outer wall portion and the rear side wall portion.

According to the above aspect, the reinforcing portion configured to reinforce the boundary between the outer wall portion and the front side wall portion or the reinforcing portion configured to reinforce the boundary between the outer wall portion and the rear side wall portion improves the yield strength of the boundary including the reinforcing portion. The boundary having a high yield strength can hardly deform. Accordingly, at the time when a load is applied to the pillar outer member from outside in the vehicle width direction, the load is easily applied in a concentrated manner to a side wall portion out of the front side wall portion or the rear side wall portion, the side wall portion having a yield strength lower than the yield strength of the boundary with respect to the outer wall portion, so that the side wall portion deforms first. When the side wall portion starts deforming once, the load thus applied to the pillar outer member is consumed by the deformation of the side wall portion. Accordingly, it is possible to restrain the load from excessively concentrating on the flange portion of the pillar outer member, where a weld with the pillar inner member exists. As a result, it is possible to restrain the breakage of the weld in the flange portion.

In the above aspect, the pillar outer member may include at least one of a front ridge portion, as the front reinforcing portion, projecting outwardly in the vehicle width direction relative to a flat portion placed in a central part of the outer wall portion in the vehicle front-rear direction and provided so as to extend along a front edge of the outer wall portion in the vehicle front-rear direction, or a rear ridge portion, as the rear reinforcing portion, projecting outwardly in the vehicle width direction relative to the that portion and provided so as to extend along a rear edge of the outer wall portion in the vehicle front-rear direction.

According to the above aspect, in a case where the front ridge portion is provided, an edge line is formed at least in a boundary between the flat portion or the front ridge portion in the outer wall portion. That is, in comparison with a case where the front ridge portion is not provided, the number of edge line existing in the vicinity of the boundary between the outer wall portion and the front side wall portion increases. When a load is applied to the pillar outer member from outside in the vehicle width direction, the load is also applied to the boundary between the outer wall portion and the front side wall portion. However, since the load is received dispersedly by the edge lines existing in the vicinity of the boundary between the outer wall portion and the front side wall portion as described above, a sectional structure of the front ridge portion can hardly break. Accordingly, in comparison with a case where the front ridge portion is not provided, the yield strength of the boundary between the outer wall portion and the front side wall portion increases. The same can be said about the case where the rear ridge portion is provided.

In the above aspect, the pillar outer member may include the front reinforcing portion configured to reinforce the boundary between the outer wall portion and the front side wall portion, and the rear reinforcing portion configured to reinforce the boundary between the outer wall portion and the rear side wall portion.

According to the above aspect, the reinforcing portion configured to reinforce the boundary between the outer wall portion and the front side wall portion and the reinforcing portion configured to reinforce the boundary between the outer wall portion and the rear side wall portion increase the yield strengths of the boundaries, so that the boundaries can hardly deform. Accordingly, when a load is applied to the pillar outer member from outside in the vehicle width direction, the load is easily applied in a concentrated manner to the front side wall portion and the rear side wall portion, which have a low yield strength, so that the side wall portions deform first. When the side wall portions start deforming once, the load can hardly be transmitted to the flange portions of the pillar outer member via the side wall portions, so that the load thus applied to the pillar outer member is consumed by the deformations of the side wall portions. Accordingly, it is possible to restrain the load from excessively concentrating on the flange portions of the pillar outer member, where the welds with the pillar inner member exist. As a result, it is possible to restrain the breakage of the welds in the flange portions.

In the above aspect, the pillar outer member may include the front ridge portion as the front reinforcing portion, and the rear ridge portion as the rear reinforcing portion.

According to the above aspect, an edge line is formed at least in the boundary between the flat portion and each of the ridge portions in the outer wall portion, and in comparison with a case where the ridge portions are not provided, the number of edge lines existing in the vicinity of the boundary between the outer wall portion and each of the side wall portions increases. When a load is applied, to the pillar outer member from outside in the vehicle width direction, the load is also transmitted to the boundary between the outer wall portion and each of the side wall portions. However, since the load is received dispersedly by the edge lines existing in the vicinity of the boundary between the outer wall portion and each of the side wall portions, a sectional structure of the each of the ridge portions can hardly break. Accordingly, in comparison with a case where the ridge portions are not provided, the yield strength of the boundary between the outer wall portion and each of the side wall portions increases.

In the above aspect, the pillar outer member may include a hem portion in which the front side wall portion extends arcuately so as to be placed closer to a front side in the vehicle front-rear direction as it goes toward a lower side of the vehicle, and the rear side wall portion extends arcuately so as to be placed closer to a rear side in the vehicle front-rear direction as it goes toward the lower side, the hem portion being provided in a part of the pillar outer member on the lower side in the vehicle up-down direction; and the front reinforcing portion and the rear reinforcing portion are provided in the hem portion in the vehicle up-down direction.

According to the above aspect, when a load is applied to the pillar outer member from outside in the vehicle width direction, the pillar outer member might be crushed in the vehicle width direction at a given part in an up-down direction, so as to bend at the crushed part as a base point. Generally, a part of the pillar outer member on the upper side secures a suitable strength to restrain the deformation. In the meantime, according to the above aspect, the hem portion provided on the lower side of the pillar outer member is provided with the reinforcing portion, and the side wall portion easily deforms in the vicinity of a part provided with the reinforcing portion, in the vehicle up-down direction. That is, the pillar outer member is easily crushed in the vehicle width direction in the hem portion provided with the reinforcing portion, so that the hem portion easily serves as a base point for bending. Accordingly, even in a case where a load is applied to the pillar outer member from outside in the vehicle width direction, the pillar outer member easily bends inwardly in the vehicle width direction at the hem portion on the lower side of the pillar outer member as the base point. The pillar outer member deforms such that its lower side swings inwardly in the vehicle width direction.

As a result, even if the pillar outer member deforms to bend it is possible to restrain an upper side of a space in a vehicle cabin from being narrowed.

In the above aspect, at least one of a condition (iii) or a condition (iv) may be satisfied, (iii) the front side wall portion includes a bending region bending in a middle in the vehicle width direction, the bending region of the front side wall portion having a front outer portion placed on an outer side in the vehicle width direction relative to a first edge line of the bending region of the front side wall portion, and a front inner portion placed on an inner side in the vehicle width direction relative to the first edge line, (iv) the rear side wall portion includes a bending region bending in the middle in the vehicle width direction, the bending region of the rear side wall portion having a rear outer portion placed on the outer side in the vehicle width direction relative to a second edge line of the bending region of the rear side wall portion, and a rear inner portion placed on the inner side in the vehicle width direction relative to the second edge line.

According to the above aspect, the pillar outer member includes the reinforcing portion configured to reinforce the boundary between the outer wall portion and the front side wall portion, or the reinforcing portion configured to reinforce the boundary between the outer wall portion and the rear side wall portion, or includes both of them. Accordingly, the deformation of the boundary between the outer wall portion and each of the side wall portions can hardly occur. In the meantime, in the bending region in the front side wall portion or the rear side wall portion, the side wall portion easily deforms to bend along the edge line. Accordingly, when a load is applied to the pillar outer member from outside in the vehicle width direction, the side wall portion including the bending region deforms first. When the side wall portion starts deforming once, the load thus applied to the pillar outer member is consumed by the deformation of the side wall portion. Accordingly, it is possible to restrain the load from excessively concentrating on the flange portion of the pillar outer member, where the weld with the pillar inner member exists. As a result, it is possible to restrain the breakage of the weld in the flange portion.

In the above aspect, both of the condition (iii) and the condition (iv) may be satisfied.

According to the above aspect, the pillar outer member includes the reinforcing portion configured to reinforce the boundary between the outer wall portion and the front side wall portion, or the reinforcing portion configured to reinforce the boundary between the outer wall portion and the rear side wall portion, or includes both of them. Accordingly, the deformation of the boundary between the outer wall portion and each of the side wall portions can hardly occur. In the meantime, in the bending region in each of the side wall portions, the each of the side wall portions easily deforms to bend along the edge line. Accordingly, when a load is applied to the pillar outer member from outside in the vehicle width direction, the side wall portions deform first. When the side wall portions start deforming once, the load can hardly be transmitted to the flange portions of the pillar outer member via the side wall portions, so that the load thus applied to the pillar outer member is consumed by the deformations of the side wall portions. Accordingly, it is possible to restrain the load from excessively concentrating on the flange portions of the pillar outer member, where the welds with the pillar inner member exist. As a result, it is possible to restrain the breakage of the welds in the flange portions.

In the above aspect, the pillar outer member may include a hem portion in which the front side wall portion extends arcuately so as to be placed closer to a front side in the vehicle front-rear direction as it goes toward a lower side of the vehicle, and the rear side wall portion extends arcuately so as to be placed closer to a rear side in the vehicle front-rear direction as it goes toward the lower side, the hem portion being provided in a part of the pillar outer member on the lower side in the vehicle up-down direction; and at least one of a pair of the front reinforcing portion and the rear reinforcing portion, or a pair of the first edge line and the second edge line is provided in the hem portion.

According to die above aspect, even in a case where the front ridge portion and the edge line are provided in different ranges, when wrinkles caused in a part other than the bending region of the front side wall portion reach the edge line at the time when a load is applied to the pillar outer member from outside in the vehicle width direction, the front side wall portion easily deforms at the edge line. The same can be said about the rear ridge portion and the edge line.

In the above aspect, the front reinforcing portion, the rear reinforcing portion, the first edge line, and the second edge line may be provided in the hem portion.

According to the above aspect, when a load is applied to the pillar outer member from outside in the vehicle width direction, the pillar outer member might be crushed in the vehicle width direction at a given part in the up-down direction, so as to bend at the crushed part as a base point. Generally, a part of the pillar outer member on the upper side secures a suitable strength to restrain the deformation. On the other hand, in the above aspect, the hem portion on the lower side of the pillar outer member is provided with the reinforcing portion. Further, the front side wall portion or the rear side wall portion or both of them are provided with an edge line. On this account, the side wall portion easily deforms in the vicinity of a part provided with the reinforcing portion and the edge line, in the vehicle up-down direction. That is, the pillar outer member is easily crushed in the vehicle width direction in the hem portion provided with the reinforcing portion and the edge line so that the hem portion easily serves as the base point for bending. Accordingly, even if a load is applied to the pillar outer member from outside in the vehicle width direction, the pillar outer member easily bends inwardly in the vehicle width direction at the hem portion on the lower side of the pillar outer member as the base point. The pillar outer member deforms such that its lower side swings in in the vehicle width direction. As a result, even if the pillar outer member deforms to bend, it is possible to restrain the upper side of the space in the vehicle cabin from being narrowed.

BRIEF DESCRIPTION OF THE DRAWINGS

Features, advantages, and technical and industrial significance of exemplary embodiments of the disclosure will be described below with reference to the accompanying drawings in which like numerals denote like elements, and wherein.

DETAILED DESCRIPTION OF EMBODIMENTS

Figure 1:
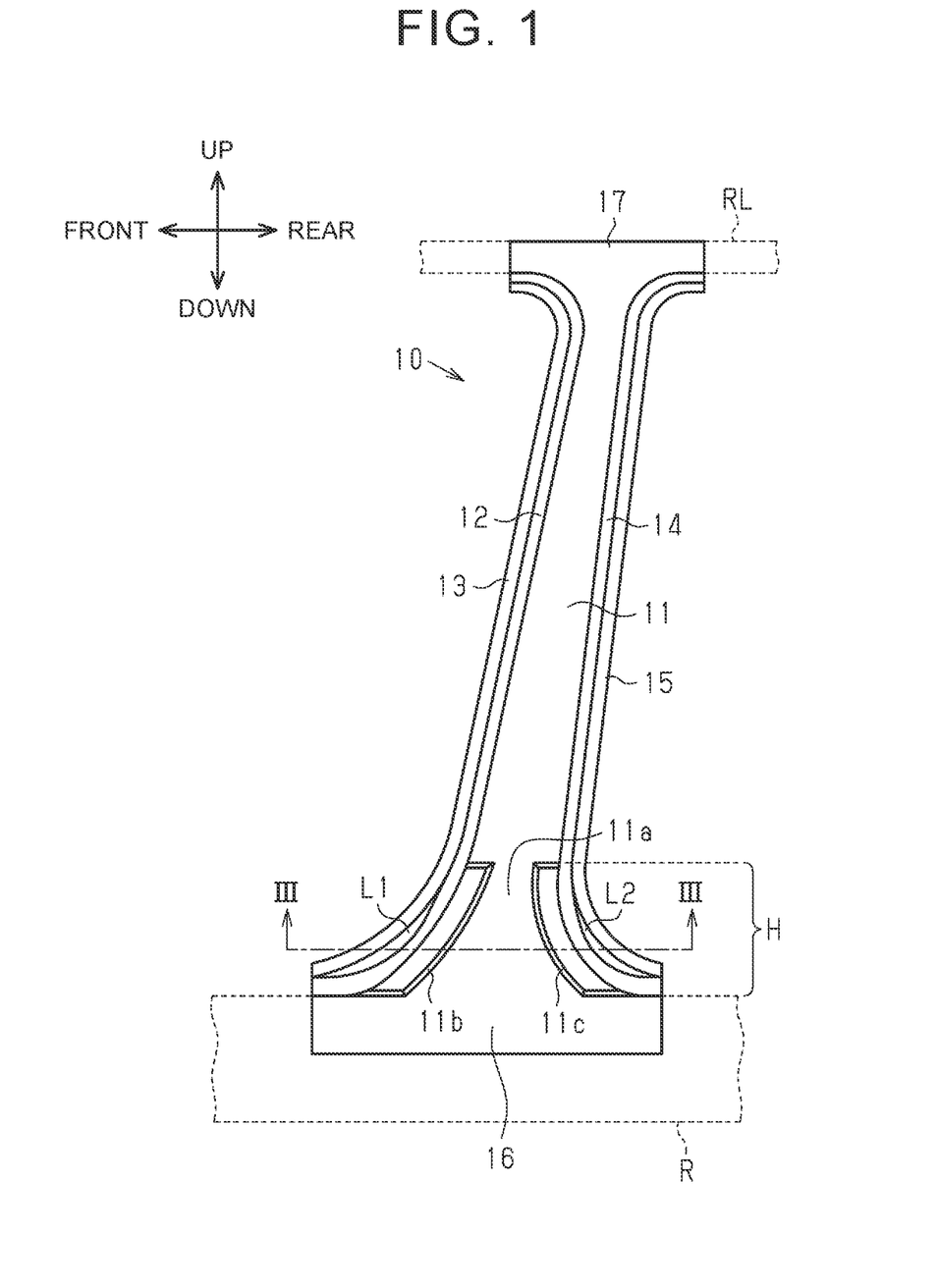
FIG. 1 is a side view of a vehicle side structure.
Figure 2:
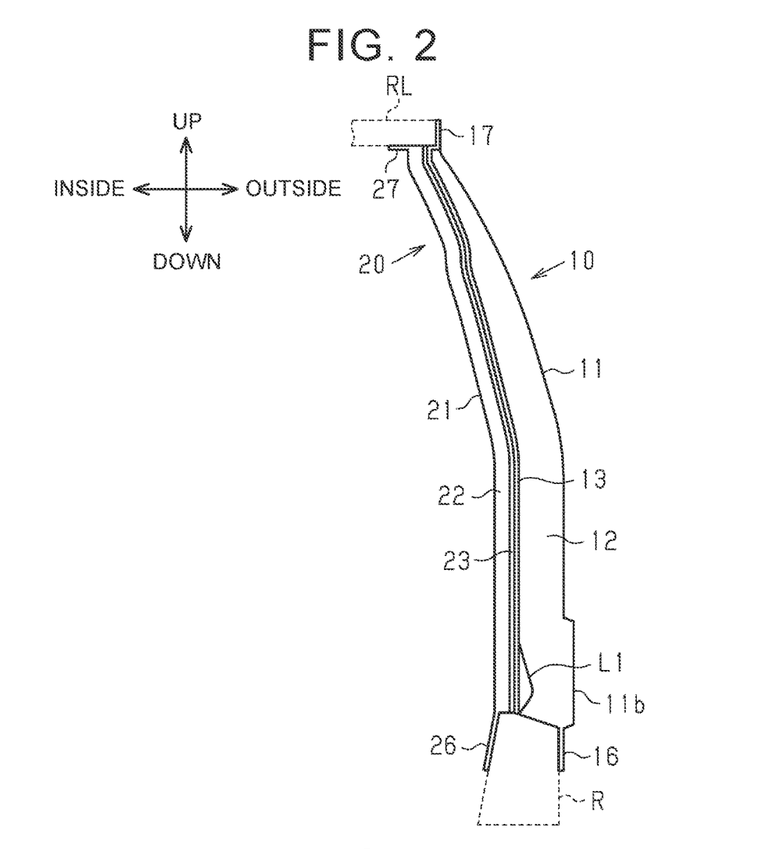
FIG. 2 is a front view of the vehicle side structure.

A vehicle side structure of the present embodiment is described below. As illustrated in FIG. 1, a pillar outer member 10 of the vehicle side structure extends from a lower side of a vehicle toward an upper side thereof. A lower end of the pillar outer member 10 is fixed to a rocker portion R having a generally squarely cylindrical shape and extending in a front-rear direction on a lower end side of a vehicle side portion. An upper end of the pillar outer member 10 is fixed to a rail outer RL supporting a top plate of the vehicle. As illustrated in FIG. 2, a pillar inner member 20 is placed opposite to an inner side of the pillar outer member 10 in the vehicle width direction. Similarly to the pillar outer member 10, a lower end of the pillar inner member 20 is fixed to the rocker portion R, and an upper end thereof is fixed to the rail outer RL.

Figure 3:
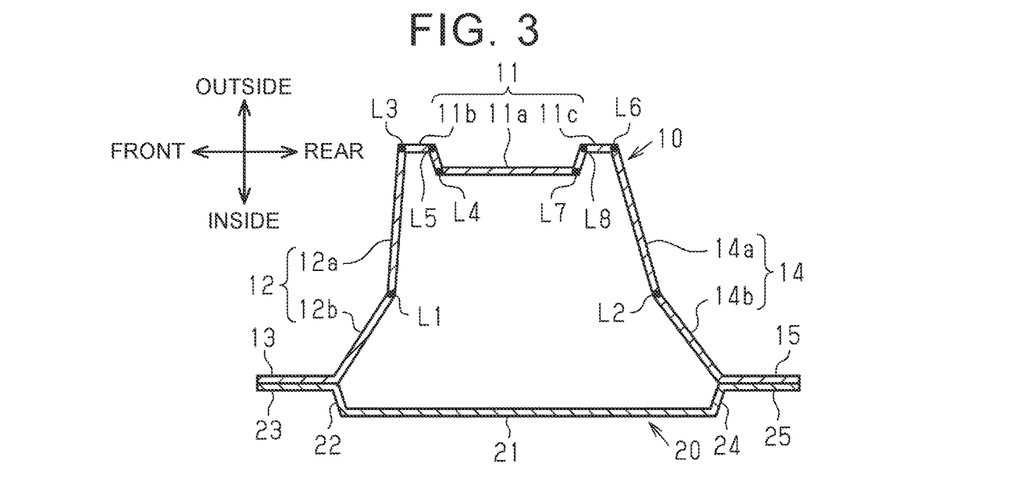
FIG. 3 is a sectional view taken along a III-III in FIG. 1.

As illustrated in FIG. 3, the pillar outer member 10 includes a plate-shaped outer wall portion 11 opposed to the pillar inner member 20 and extending from the lower side of the vehicle toward the upper side thereof. As illustrated in FIG. 2, a generally lower half of the outer wall portion 11 extends generally in a vehicle up-down direction. Further, a generally upper half of the outer wall portion 11 curves inwardly in the vehicle width direction as it goes toward the upper side.

As illustrated in FIG. 1, a part of the pillar outer member 10 on the lower side, which part is within a predetermined range on the upper side relative to the rocker portion R, serves as a hem portion H. In the bent portion H, a width of the outer wall portion 11 in a vehicle front-rear direction increases as it goes toward a vehicle lower side. Further, in the hem portion H, an increasing rate of the width of the outer wall portion 11 in the vehicle front-rear direction increases as it goes toward the vehicle lower side. That is, in the hem portion H of the pillar outer member 10, an edge of the outer wall portion 11 on a vehicle front side extends arcuately so as to be placed gradually closer to the vehicle front side as it goes toward the lower side, and an edge of the outer wall portion 11 on a vehicle rear side extends arcuately so as to be placed gradually closer to the vehicle rear side as it goes toward the lower side.

In a central part of the pillar outer member 10 in the vehicle up-down direction, on the upper side relative to the hem portion H, the width of the outer wall portion 11 in the vehicle front-rear direction slightly decreases as it goes toward a vehicle upper side. In this part, a decreasing rate of the width of the outer wall portion 11 in the vehicle front-rear direction is uniform, and the edge of the outer wall portion 11 on the vehicle front side and the edge thereof on the vehicle rear side extend linearly. In an upper end portion of the pillar outer member 10, the width of the outer wall portion 11 in the vehicle front-rear direction increases as it goes toward the vehicle upper side. Further, in this part, the increasing rate of the width in the vehicle front-rear direction increases as it goes toward the vehicle upper side. That is, in a part of the outer wall portion 11 on the upper side in the vehicle up-down direction, the edge of the outer wall portion 11 on the vehicle front side extends arcuately so as to be placed gradually closer to the vehicle front side as it goes toward the upper side, and the edge of the outer wall portion 11 on the vehicle rear side extends arcuately so as to be placed gradually closer to the vehicle rear side as it goes toward the upper side.

As illustrated in FIG. 3, a front side wall portion 12 extends inwardly (toward the pillar inner member 20 side) in the vehicle width direction from the edge of the outer wall portion 11 on the vehicle front side. The front side wall portion 12 is provided over an entire region of the outer wall portion 11 in its extending direction. Further, as a whole, the front side wall portion 12 is inclined so as to be placed closer to the vehicle front side as it goes inwardly in the vehicle width direction. A flange portion (a front flange portion) 13 extends from an inner edge of the front side wall portion 12 in the vehicle width direction toward the vehicle front side. The flange portion 13 is provided over an entire region of the front side wall portion 12 in its extending direction.

A rear side wall portion 14 extends inwardly in the vehicle width direction from the edge of the outer wall portion 11 on the vehicle rear side. The rear side wall portion 14 is provided over the entire region of the outer wall portion 11 in its extending direction. Further, as a whole, the rear side wall portion 14 is inclined so as to be placed on the vehicle rear side as it goes inwardly in the vehicle width direction. A flange portion (a rear flange portion) 15 extends from an inner edge of the rear side wall portion 14 in the vehicle width direction toward the vehicle rear side. The flange portion 15 is provided over an entire region of the rear side wall portion 14 in its extending direction.

As illustrated in FIG. 1, in the hem portion H of the pillar outer member 10, the front side wall portion 12 and the rear side wall portion 14 extend along respective extending directions of the edge of the outer wall portion 11 on the vehicle front side and the edge thereof on the vehicle rear side, respectively. That is, in the hem portion H, the front side wall portion 12 extends arcuately so as to be placed closer to the vehicle front side as it goes toward the vehicle lower side, and the rear side wall portion 14 extends arcuately so as to be placed closer to the vehicle rear side as it goes toward the vehicle lower side.

A lower wall portion 16 extends downward from a lower edge of the outer wall portion 11 of the pillar outer member 10. The lower wall portion 16 has a long rectangular shape in the vehicle front-rear direction in a side view. As illustrated in FIG. 2, an inner surface of the lower wall portion 16 in the vehicle width direction makes surface contact with an outer surface of the rocker portion R in the vehicle width direction, so that they are fixed by welding.

As illustrated in FIG. 1, an upper wall portion 17 extends upward from an upper edge of the outer wall portion 11 of the pillar outer member 10. The upper wall portion 17 has a long rectangular shape in the vehicle front-rear direction in a side view. As illustrated in FIG. 2, an inner surface of the upper wall portion 17 in the vehicle width direction makes surface contact with an outer surface of the rail outer RL in the vehicle width direction, so that they are fixed by welding.

As illustrated in FIG. 3, the pillar inner member 20 includes a plate-shaped inner wall portion 21 opposed to the outer wall portion 11 of the pillar outer member 10 and extending from the lower side of the vehicle toward the upper side thereof. As illustrated in FIG. 2, a generally lower half of the inner wall portion 21 extends generally in the vehicle up-down direction so as to be parallel to the outer wall portion 11 of the pillar outer member 10. Further, a generally upper half of the inner wall portion 21 curves inwardly in the vehicle width direction as it goes toward the upper side.

A width of the inner wall portion 21 in the vehicle front-rear direction is similar to the outer wall portion 11 of the pillar outer member 10. That is, in the hem portion 11 of the pillar outer member 10, the width of the inner wall portion 21 in the vehicle front-rear direction increases as it goes toward the vehicle lower side, and an increasing rate thereof also increases as it goes toward the lower side. Further, in a central part of the pillar inner member 20 in the vehicle up-down direction on the upper side relative to the hem portion H, the width of the inner wall portion 21 in the vehicle from direction slightly decreases as it goes toward the vehicle upper side. In an upper part of the pillar inner member 20, the width of the inner wall portion 21 in the vehicle front-rear direction increases as it goes toward the vehicle upper side, and an increasing rate thereof also increases as it goes toward the upper side.

As illustrated in FIG. 3, a front side wall portion 22 extends outwardly (toward the pillar outer member 10 side) in the vehicle width direction from an edge of the inner wall portion 21 on the vehicle front side. The front side wall portion 22 is provided over an entire region of the inner wall portion 21 in its extending direction. A length of the front side wall portion 22 in the vehicle width direction is shorter than a length of the front side wall portion 12 of the pillar outer member 10 in the vehicle width direction. A flange portion 23 extends toward the vehicle front side from an outer edge of the front side wall portion 22 of the pillar inner member 20 in the vehicle width direction. The flange portion 23 is provided over an entire region of the front side wall portion 22 in its extending direction. The flange portion 23 is placed opposite to the flange portion 13 of the pillar outer member 10. An outer surface of the flange portion 23 in the vehicle width direction and an inner surface of the flange portion 13 of the pillar outer member 10 in the vehicle width direction are fixed to each other by welding.

As illustrated in FIG. 3, a rear side wall portion 24 extends outwardly in the vehicle width direction from an edge of the inner wall portion 21 on the vehicle rear side. The rear side wall portion 24 is provided over the entire region of the inner wall portion 21 in its extending direction. A length of the rear side wall portion 24 in the vehicle width direction is shorter than a length of the rear side wall portion 14 of the pillar outer member 10 in the vehicle width direction. A flange portion 25 extends toward the vehicle rear side from an inner edge of the rear side wall portion 24 of the pillar outer member 20 in the vehicle width direction. The flange portion 25 is provided over an entire region of the rear side wall portion 24 in its extending direction. The flange portion 25 is placed opposite to the flange portion 15 of the pillar outer member 10. An outer surface of the flange portion 25 in the vehicle width direction and an inner surface of the flange portion 15 of the pillar outer member 10 in the vehicle width direction are fixed to each other by welding.

As illustrated in FIG. 2, a lower wall portion 26 extends downward from a lower edge of the inner wall portion 21 of the pillar inner member 20. The lower wall portion 26 has a long rectangular shape in the vehicle front-rear direction in a side view. An outer surface of the lower wall portion 26 in the vehicle width direction makes surface contact with an inner surface of the rocker portion R in the vehicle width direction, so that they are fixed by welding. An upper wall portion 27 extends inwardly in the vehicle width direction from an upper edge of the inner wall portion 21 of the pillar inner member 20. An upper surface of the upper wall portion 27 makes surface contact with a lower surface of the rail outer RL, so that they are fixed by welding.

As illustrated in FIG. 3, within the range of the hem portion 11, the outer wall portion 11 of the pillar outer member 10 is constituted by a flat portion 11a placed in a central part in the vehicle front-rear direction, a front ridge portion 11b placed on the front side relative to the flat portion 11a in the vehicle front-rear direction, and a rear ridge portion 11c placed on the rear side relative to the flat portion 11a in the vehicle font rear direction. The front ridge portion 11b and the rear ridge portion 11c project outwardly the vehicle width direction relative to the flat portion 11a, and have a generally square shape in a section view.

As illustrated in FIG. 1, the front ridge portion 11b extends along a front edge of the outer wall portion 11 within the range of the hem portion H in the vehicle up-down direction. Further, the rear ridge portion 11c extends in the vehicle up-down direction along a rear edge of the outer wall portion 11 within the range of the hem portion H. Dimensions of the front ridge portion 11b and the rear ridge portion 11a in the vehicle front rear direction are uniform in the vehicle front-rear direction and in the vehicle up-down direction. Further, in any part in the vehicle up-down direction, the dimensions of the front ridge portion 11b and the rear ridge portion 11c in the vehicle front rear direction are set so as not exceed a dimension of the flat portion 11a in the vehicle width direction. That is, in the hem portion H of the pillar outer member 10, the flat portion 11a occupies a larger ratio in the vehicle front-rear direction and the front ridge portion 11b and the rear ridge portion 11c occupy smaller ratios toward the lower side of the outer wall portion 11.

Note that the front ridge portion 11b and the rear ridge portion 11c are not provided outside the range of the hem portion H in the vehicle up-down direction. Outside the range of the hem portion H, the outer wall portion 11 is constituted only by the flat portion 11a. Further, in this embodiment, the front ridge portion 11b corresponds to a reinforcing portion that makes a yield strength of a boundary between the outer wall portion 11 and the front side wall portion 12 higher than a yield strength of the front side wall portion 12 at the time when a load is applied to the outer wall portion 11 at a right angle from outside in the vehicle width direction. Further, the rear ridge portion 11c corresponds to a reinforcing portion that makes a yield strength of a boundary between the outer wall portion 11 and the rear side wall portion 14 higher than a yield strength of the rear side wall portion 14 at the time when a load is applied to the outer wall portion 11 at a right angle from outside in the vehicle width direction.

As illustrated in FIG. 3, the front side wall portion 12 of the pillar outer member 10 bends in the middle in the vehicle width direction, and includes a bending region having art outer portion (a front outer portion) 12a placed on an outer side in the vehicle width direction relative to an edge line (a first edge line) L1 of the bending, and an inner portion (a front inner portion) 12b placed on an inner side in the vehicle width direction relative to the edge line L1. The inner portion 12b of the front side wall portion 12 is inclined relative to the outer portion 12a connected thereto via the edge line L1, so that the inner portion 12b is placed closer to the vehicle front side as it goes inwardly in the vehicle width direction. In this embodiment, as illustrated in FIG. 1, the bending region (the edge line L1) of the front side wall portion 12 is provided only in the hem portion H the pillar outer member 10, and is not provided in the other parts of the pillar outer member 10 in the vehicle up-down direction. That is, the bending region (the edge line L1) of the front side wall portion 12 and the front ridge portion 11b of the outer wall portion 11 are placed in the same range in the vehicle tip-down direction.

As illustrated in FIG. 2, a part of the edge line L1 in the front side wall portion 12 on a side closer to a center in the up-down direction in the bending region (the hem portion H is placed closer to the outer side in the vehicle width direction (closer to the edge of the outer wall portion 11 on the vehicle front side in FIG. 1). The edge line L1 is placed closer to the inner side in the vehicle width direction as it goes toward the upper side or the lower side from a central part of the bending region (the hem portion H). Both ends of the edge line L1 in the vehicle up-down direction reach a boundary line between the front side wall portion 12 and the flange portion 13, and the edge line L1 is not formed on the vehicle upper side and on the vehicle lower side relative to those parts. Further, as illustrated in FIG. 3, an outermost part of the edge line L1 of the front side wall portion 12 in the vehicle width direction is placed within a half of the front side wall portion 12 on the flange portion 13 side.

As illustrated in FIG. 3, the rear side wall portion 14 bends in the middle in the vehicle width direction and includes a bending region having an outer portion (a rear outer portion) 14a placed on the outer side in the vehicle width direction relative to an edge line (a second edge line) L2 of the bending, and an inner portion (a rear inner portion) 14b placed on the inner side in the vehicle width direction relative to the edge line L2. The inner portion 14b of the rear side wall portion 14 is inclined relative to the outer portion 14a connected thereto via the edge line L2, so that the inner portion 14b is placed closer to the vehicle rear side as it goes inwardly in the vehicle width direction. Note that, in this embodiment, as illustrated in FIG. 1, the bending region (the edge line L2) of the rear side wall portion 14 is provided only in the hem portion H of the pillar outer member 10, and is not provided in the other parts of the pillar outer member 10 in the vehicle up-down direction. That is, the bending region (the edge line L2) of the rear side wall portion 14 and the rear ridge portion 11c of the outer wall portion 11 are placed in the same range in the vehicle up-down direction.

As illustrated in FIG. 2, a part of the edge line L2 of the rear side wall portion 14 on a side closer to a center of the bending region (the hem portion in the up-down direction is placed closer to the outer side in the vehicle width direction (closer to the edge of the outer wall portion 11 on the vehicle rear side in FIG. 1). The edge line 12 is placed closer to the inner side in the vehicle width direction as it goes toward the upper side or the lower side from a central part of the bending region (the hem portion H). Both ends of the edge line L2 in the vehicle up-down direction reach a boundary line between the rear side wall portion 14 and the flange portion 15, and the edge line L2 is not formed on the vehicle upper side and on the vehicle lower side relative to those parts. Further, as illustrated in FIG. 3, even an outermost part of the edge line L2 of the rear side wall portion 14 in the vehicle width direction is placed within a half of the rear side wall portion 14 on the flange portion 15 side. A position of the edge line L2 of the rear side wall portion 14 in the vehicle width direction is placed at the same position as the edge line L1 of the front side wall portion 12 in the vehicle width direction, when the pillar outer member 10 is viewed on a section perpendicular to the vehicle up-down direction.

Operation and effects of the vehicle side structure configured as described above will be described. First described is a case where the outer wall portion 11 of the pillar outer member 10 is not provided with the front ridge portion 11b and the rear ridge portion 11e, and the front side wall portion 12, and the rear side wall portion 14 do not bend in the middle (the edge line L1 and the edge line L2 do not exist).

Figure 4:
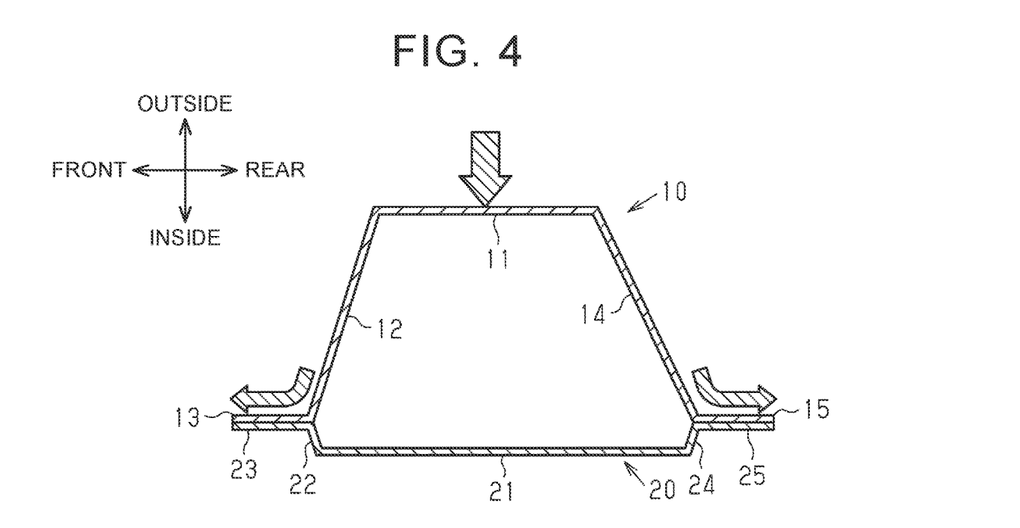
FIG. 4 is a sectional view illustrating a transmission aspect of a load at the time when an outer wall portion is not provided with a ridge portion and a front side wall portion and a rear side wall portion do not have an edge line.

As illustrated in FIG. 4, when a load is applied to the outer wall portion 11 of the pillar outer member 10 from outside in the vehicle width direction, the load transmitted to the flange portion 13 and the flange portion 15 via the front side wall portion 12 and the rear side wall portion 14, respectively. Here, the front side wall portion 12 and the rear side wall portion 14 extend so as to be directed outwardly in the vehicle front-rear direction as it goes inwardly in the vehicle width direction. Accordingly, the load applied to the outer wall portion 11 from outside in the vehicle width direction works as a force to move an inner end of the front side wall portion 12 in the vehicle width direction toward the vehicle front side, and a force to move an inner end of the rear side wall portion 14 in the vehicle width direction toward the vehicle rear side, as indicated by arrows in FIG. 4. Then, the flange portion 13 of the pillar outer member 10 is to move toward the vehicle front side relative to the pillar inner member 20, and the flange portion 15 is to move toward the vehicle rear side relative to the pillar inner member 20. Depending on a magnitude of the load to be applied to the outer wall portion 11 of the pillar outer member 10 and a direction where the load works, the load might concentrate on the flange portion 13 or the flange portion 15 in the pillar outer member 10. In such a case, a weld between the flange portion 13 of the pillar outer member 10 and the flange portion 23 of the pillar inner member 20 might break, or a weld between the flange portion 15 of the pillar outer member 10 and the flange portion 25 of the pillar inner member 20 might break. When the weld breaks, the pillar outer member 10 and, the pillar inner member 20 are partially separated from each other, so that expected impact absorbing performance might not be demonstrated.

In the vehicle side structure of the embodiment, the outer wall portion 11 of the pillar outer member 10 is provided with the front ridge portion 11b projecting from the flat portion 11a. Accordingly, as illustrated in FIG. 3, in the vicinity of a boundary between the outer wall portion 11 and the front side wall portion 12, not only an edge line L3 as a boundary line between the outer wall portion 11 and the front side wall portion 12, but also an edge line L4 as a boundary line between the flat portion 11a and the front ridge portion 11b is formed. Further, since the front ridge portion 11b has a generally square section, an edge line L5 is also formed at a corner or a projecting tip end of the front ridge portion 11b. That is, in this embodiment, in the hem portion H, the three edge lines are formed in a concentrated manner in the vicinity of the boundary between the outer wall portion 11 and the front side wall portion 12 in the pillar outer member 10. When a load is applied to the pillar outer member 10 from outside in the vehicle width direction, the load is transmitted to the boundary between the outer wall portion 11 and the front side wall portion 12, but the load is received dispersedly by the edge line L3, the edge line L4, and the edge line L5. Accordingly, in the vicinity of the boundary between the outer wall portion 11 and the front side wall portion 12, even if the load is applied from outside in the vehicle width direction, the generally square shape of the section of the front ridge portion 11b hardly breaks. That is, in comparison with a case where the front ridge portion 11b is not provided, the yield strength of the boundary between the outer wall portion 11 and the front side wall portion 12 at the time when the load is applied to the outer wall portion 11 at a right angle from outside in the vehicle width direction is high.

Further, similarly, in the hem portion H, in the vicinity of a boundary between the outer wall portion 11 and the rear side wall portion 14, an edge line L6 as a boundary line between the outer wall portion 11 and the rear side wall portion 14, an edge line L7 as a boundary line between the flat portion 11a and the rear ridge portion 11c, and an edge line L8 as a corner of a projecting tip end of the rear ridge portion 11c are formed in a concentrated manner. Accordingly, in comparison with a case where the rear ridge portion 11c is not provided, the yield strength of the boundary between the outer wall portion 11 and the rear side wall portion 14 at the time when a load is applied to the outer wall portion 11 at a right angle from outside in the vehicle width direction is high.

In the meantime, the front side wall portion 12 of the pillar outer member 10 bends in the middle in the vehicle width direction, so that the edge line L1 is formed. Accordingly, when a load is applied to the pillar outer member 10 from outside in the vehicle width direction, the front side wall portion 12 easily bends at the edge line L1 serving as a base point. That is, a yield strength at the edge line L1 of the front side wall portion 12 is lower than the yield strength of the boundary between the outer wall portion 11 and the front side wall portion 12. Similarly the rear side wall portion 14 of the pillar outer member 10 bends in the middle in the vehicle width direction, so that the edge line L2 is formed. Accordingly, when a load is applied to the pillar outer member 10 from outside in the vehicle width direction, the rear side wall portion 14 easily bends at the edge line L2 serving as a base point. That is, a yield strength at the edge line L2 of the rear side wall portion 14 is lower than the yield strength of the boundary between the outer wall portion 11 and the roar side wall portion 14.

Figure 5:
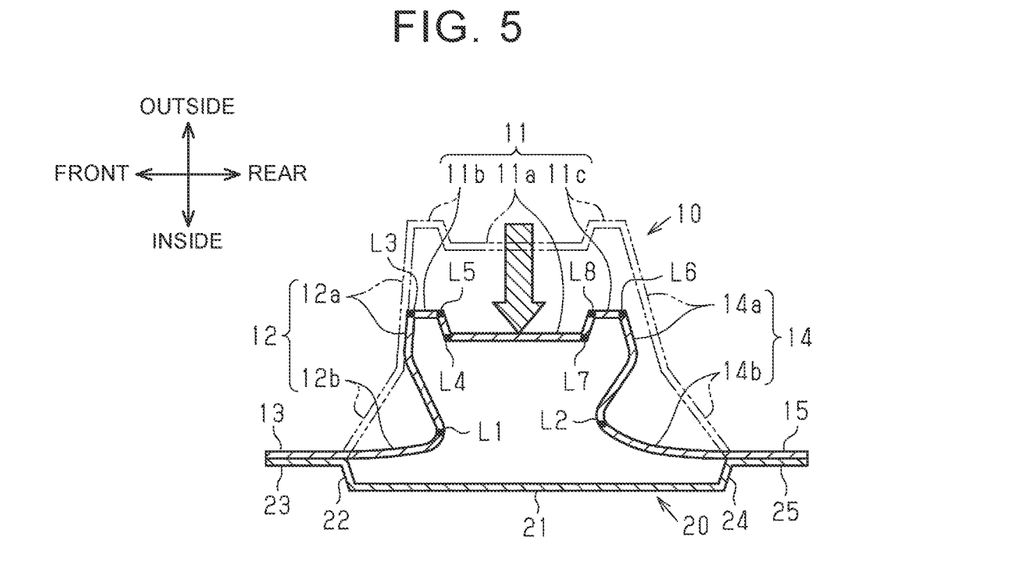
FIG. 5 is a sectional view illustrating a deformation aspect of a pillar outer member at the time when a load is applied from outside in a vehicle width direction in the vehicle side structure of the embodiment.

In the embodiment in which a relationship between the yield strengths is designed as described above, when a load is applied to the pillar outer member 10 from outside in the vehicle width direction, the load is easily applied in a concentrated manner to the front side wall portion 12 and the rear side wall portion 14. Accordingly, as illustrated in FIG. 5, the front side wall portion 12 and the rear side wall portion 14 bend at the edge line L1 and the edge line L2 as the base points, respectively, earlier than the boundary between the outer wall portion 11 and the front side wall portion 12 and the boundary between the outer wall portion 11 and the rear side wall portion 14. When the front side wall portion 12 and the rear side wall portion 14 start deforming to bend as such, the load can hardly be transmitted to the flange portion 13 and the flange portion 15, so that the load thus applied to the pillar outer member 10 is consumed by bending deformations of the front side wall portion 12 and the rear side wall portion 14. Accordingly, it is possible to restrain the load from excessively concentrating on the flange portion 13 and the flange portion 15 of the pillar outer member 10, where welds with the pillar inner member 20 exist. As a result, it is possible to re strait the breakage of welds in the flange portion 13 and the flange portion 15.

When a load is further applied to the pillar outer member 10 from outside in the vehicle width direction even after the bending deformation of the front side wall portion 12 at the edge line L1 as the base point and the bending deformation of the rear side wall portion 14 at the edge line L2 as the base point reach their limits, the outer portion 11, the outer portion 12a of the front side wall portion 12, and the outer portion 14a of the rear side wall portion 14 also start deforming.

Figure 6:
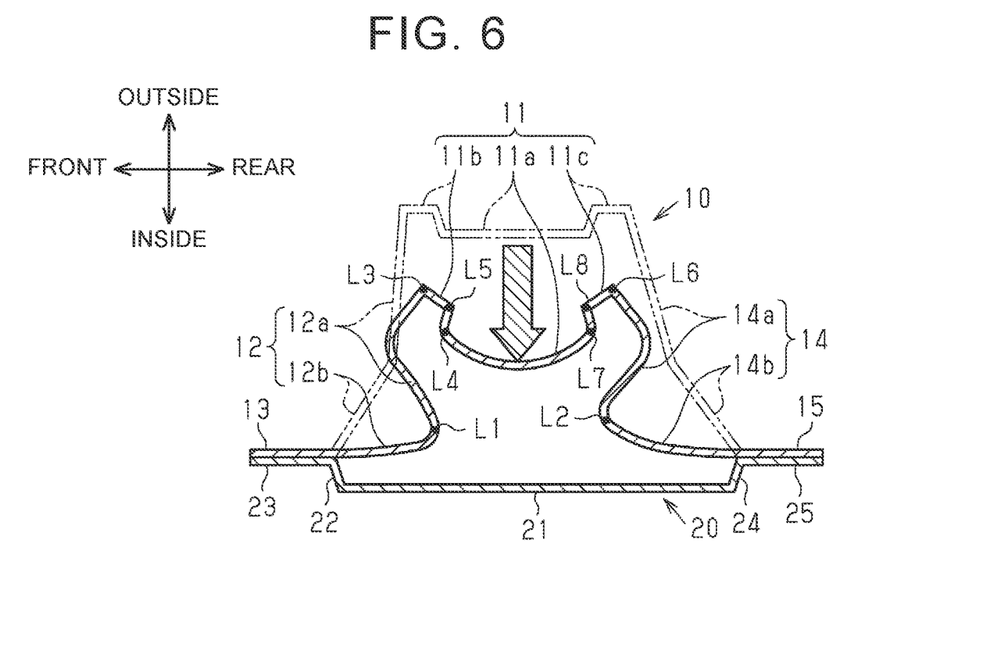
FIG. 6 is a sectional view illustrating a deformation aspect of the pillar outer member at the time when a load is applied from outside in the vehicle width direction in the vehicle side structure of the embodiment.

At this time, as described above, the edge lines L3 to L5 are formed in the vicinity of the boundary between the outer wall portion 11 and the front side wall portion 12 in a concentrated manner, so that the generally square shape of the section of the front ridge portion 11b is easily maintained. Also, the edge lines L6 to L8 are formed in the vicinity of the boundary between the outer wall portion 11 and the rear side wall portion 14 in a concentrated manner, so that the generally square shape of the section of the rear ridge portion 11c is easily maintained. On the other hand, the edge lines are not thrilled in a concentrated manner in the flat portion 11a of the outer wall portion 11 as compared with the vicinity of the boundary between the outer wall portion 11 and the front side wall portion 12 and the vicinity of the boundary between the outer wall portion 11 and the rear side wall portion 14, so that the flat portion 11a easily deforms as compared with the vicinities of those boundaries. Accordingly, at the time when a deformation occurs in the outer wall portion 11 the deformation easily occurs such that a central part of the flat portion 11a in the vehicle front-rear direction projects inwardly in the vehicle width direction, as illustrated in FIG. 6. When the outer wall portion 11 deforms as such, a central part of the outer portion 12a of the front side wall portion 12 in the vehicle width direction bends so as to project toward the vehicle front side. That is, the front side wall portion 12 not only bends at the edge line L1 as the base point, but also bends at the central part of the outer portion 12a in the vehicle width direction as a base point so that the front side wall portion 12 bends in a shape folded several times as a whole. Accordingly, for example, in comparison with a case where the front side wall portion 12 can deform to bend only at the edge line L1 as the base point, a larger load is required to deform the front side wall portion 12, and thus, a high impact absorption effect can be expected. The same can be said about the rear side wall portion 14. That is, the rear side wall portion 14 bends in a shape folded several times, so that a high impact absorption effect can be expected.

In the meantime, when a load is applied to the pillar outer member 10 from outside in the vehicle width direction, the pillar outer member 10 might be crushed in the vehicle width direction at a given part in the up-down direction, so as to bend at the crushed part as a base point. Generally, a part of the pillar outer member 10 on the upper side in the up-down direction secures a suitable strength to restrain the deformation. In the meantime, in the above embodiment, the hem portion H of the pillar outer member 10 is provided with the front ridge portion 11b, the rear ridge portion 11c, and the bending regions (the edge line L1 and the edge line L2). Accordingly, the front side wall portion 12 and the rear side wall portion 14 easily deform in the hem portion H. That is, when a load is applied to the pillar outer member 10 from outside in the vehicle width direction, the pillar outer member 10 is easily crashed in the vehicle width direction in the hem portion H, so that the hem portion H easily serves as a base point for bending. When the pillar outer member 10 bends in the hem portion H, the pillar outer member 10 deforms such that its lower end swings inwardly in the vehicle width direction with its upper end serving as a supporting point. With such a deformation aspect of the pillar outer member 10, a lower side of a space in a vehicle cabin might be narrowed, but it is possible to restrain an upper side of the space in the vehicle cabin from being narrowed.

The embodiment can be modified as follows—If the pillar outer member 10 and the pillar inner member 20 extend from the lower side of the vehicle toward the upper side thereof as a whole, they may not be fixed to the rocker portion R and the rail outer RL. For example, in a case where a technique related to the pillar outer member 10 and the pillar inner member 20 of the embodiment is applied to a front pillar (an A pillar), respective bottom ends of the pillar outer member 10 and the pillar inner member 20 are connected to parts different from the rocker portion R, such as an apron upper member in a frame structure for the vehicle.

The setting of the width of the outer wall portion 11 of the pillar outer member 10 in the vehicle front-rear direction is not limited to the above embodiment. For example, the width of the outer wall portion 11 in the vehicle front-rear direction may be uniform over a whole region in the vehicle up-down direction. Note that, depending on how the width of the outer wall portion 11 in the vehicle front-rear direction is set, the hem portion H that extends arcuately so that the front side wall portion 12 and the rear side wall portion 14 are placed closer to the outer side in the vehicle front-rear direction as it goes downward may not be formed in the pillar outer member 10. Even in such a case, if the front ridge portion 11b, the rear ridge portion 11c, and the bending regions (the edge line L1 and the edge line L2) are provided so as to reach respective lower ends of the front side wall portion 12 and the rear side wall portion 14 of the pillar outer member 10, it is possible to obtain an effect similar to the effect in the embodiment.

The pillar inner member 20 may have any shape which can be fixed to the pillar outer member 10 on the inner side in the vehicle width direction relative to pillar outer member 10. For example, the whole pillar inner member 20 may be formed in a flat-plate shape or may have a section curved arcuately.

The fixation between the flange portion 13, 15 of the pillar outer member 10 and the flange portion 23, 25 of the pillar inner member 20 may not be necessarily made by welding. For example, in addition to or instead of the welding, they may be fixed by bolts and the like.

In the front side wall portion 12 of the pillar outer member 10, an inclination direction of the inner portion 12b relative to the outer portion 12a is not limited to the above embodiment. That is, the inner portion 12b may be inclined so as to be placed closer to the rear side relative to the outer portion 12a as it goes inwardly in the vehicle width direction. The same can be said about the rear side wall portion 14. That is, the inner portion 14b may be inclined so as to be placed closer to the front side relative to the outer portion 14a as it goes inwardly in the vehicle width direction.

The front ridge portion 11b and the rear ridge portion 11c of the outer wall portion 11 may not be necessarily provided in the hem portion 11. For example, instead of or in addition to the hem portion H in the pillar outer member 10, the front ridge portion 11b and the rear ridge portion 11c of the outer wall portion 11 may be provided in a central part of the pillar outer member 10 in the vehicle up-down direction. In those parts of the pillar outer member 10 where the front ridge portion 11b and the rear ridge portion 11c are provided, when a load is applied from outside in the vehicle width direction, the load easily concentrates on the front side wall portion 12 and rear side wall portion 14, and the parts deform to serve as the base points for bending of the pillar outer member 10. In some embodiments, in consideration of a shape, a strength, and the like of the whole vehicle, the front ridge portion 11b and the rear ridge portion 11c are provided in parts to be desired to serve as the base points for bending of the pillar outer member 10 at the time when a load is applied from outside in the vehicle width direction.

Similarly the bending region (the edge line L1) in the front side wall portion 12 and the bending region (the edge line L2) in the rear side wall portion 14 may not be necessarily provided in the hem portion. For example, instead of or in addition to the hem portion H in the pillar outer member 10, the bending region of the front side wall portion 12 and the bending region of the rear side wall portion 14 may be provided in the central part of the pillar outer member 10 in the vehicle up-down direction. In some embodiments, the bending regions are provided in the same range as the front ridge portion 11b and the rear ridge portion 11c in the outer wall portion 11 in the vehicle up-down direction.

In the above embodiment, the edge line L1 in the front side wall portion 12 is placed closer to the outer side in the vehicle width direction as it goes toward a central part of the bending region (the hem portion H) in the up-down direction, and is also placed closer to the inner side in the vehicle width direction as it goes from the central part toward the upper side or the lower side. However, the edge line L1 is not limited to this. For example, the edge line L1 in the front side wall portion 12 may be also placed at the same position in the vehicle width direction in any parts in the bending region in the up-down direction. That is, an extension aspect of the edge line L1 should be determined appropriately in consideration of an overall shape, easiness of machining, and the like of the pillar outer member 10 including the hem portion H. The same can be said about the edge line L2 in the rear side wall portion 14.

In the pillar outer member 10, the front ridge portion 11b and the bending region (the edge line L1) may not be necessarily provided in the same range in the vehicle up-down direction. For example, the front ridge portion 11b and the bending region (the edge line L1) may be provided so as to partially overlap with each other in the vehicle up-down direction. Further the front ridge portion 11b and the bending region (the edge line L1) may be provided in different ranges in the vehicle up-down direction such that they do not overlap with each other. Even in a case where the front ridge portion 11b and the bending region (the edge line L1) are provided in different ranges, when wrinkles caused in a part other than the bending region of the front side wall portion 12 reach the edge line L1 at the time when a load is applied to the pillar outer member 10 from outside in the vehicle width direction, the from side wall portion 12 easily deforms at the edge line L1. The same can be said about the rear ridge portion 11c and the bending region (the edge line L2).

Figure 7:
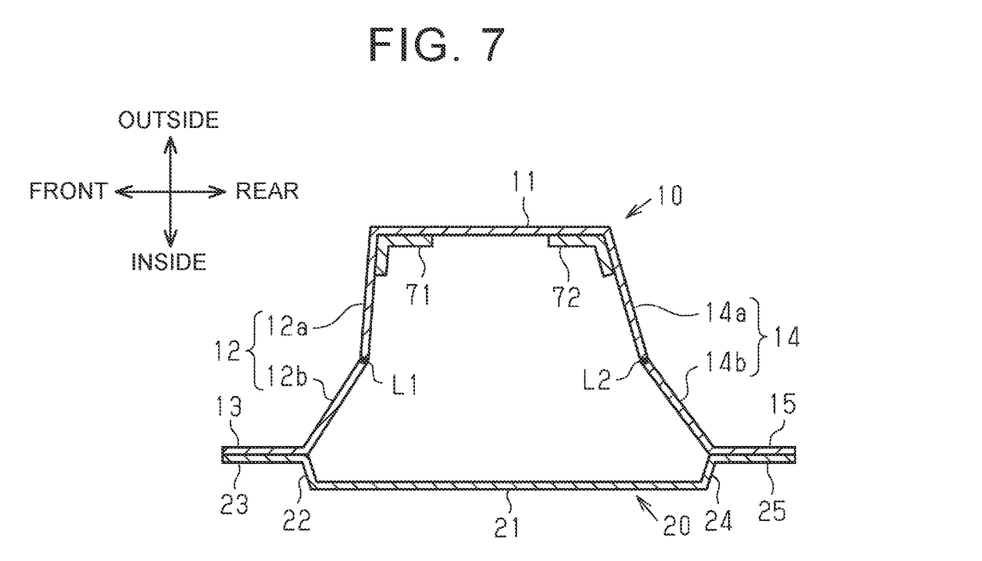
FIG. 7 is a sectional view of a vehicle side structure in a modification.

The pillar outer member 10 may be a reinforcing portion different from the front ridge portion 11b and the rear ridge portion 11c. For example, in the example illustrated in FIG. 7, a plate-shaped front patch material 71 is fixed onto an inner surface of a pillar outer member 10 in the vehicle width direction, so as to reach an outer edge of a front side wall portion 12 in the vehicle width direction from an edge of an outer wall portion 11 on the vehicle front side. Further, a plate-shaped rear patch material 72 is fixed so, as to reach an outer edge of a rear side wall portion 14 in the vehicle width direction from an edge of the outer wall portion 11 on the vehicle rear side. The front patch material 71 and the rear patch material 72 can also provide an effect similar to the effect of the front ridge portion 11b and the rear ridge portion 11c in the above embodiment. Note that the front patch material 71 and the rear patch material 72 may be fixed to an outer surface of the pillar outer member 10 in the vehicle width direction.

Figure 8:
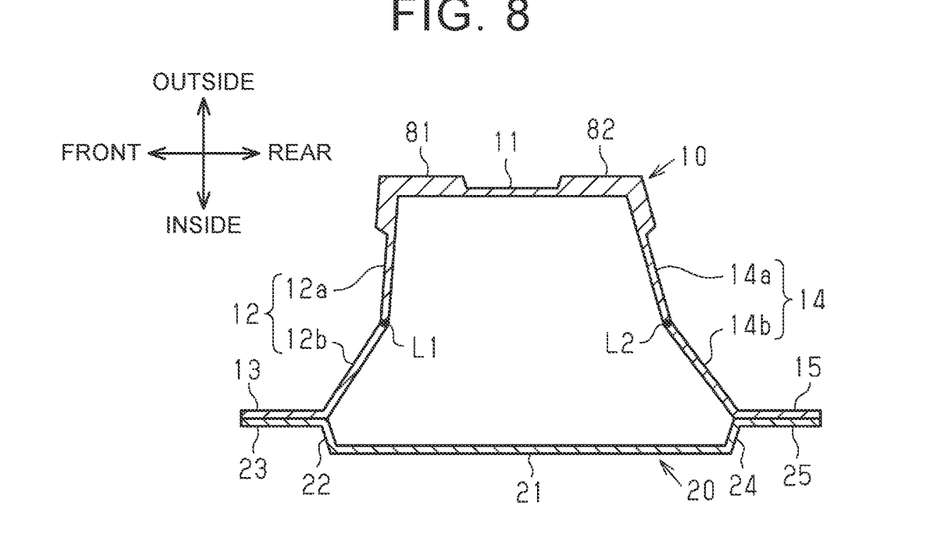
FIG. 8 is a sectional view of a vehicle side structure in a modification.

Further, in the example illustrated in FIG. 8, for example, a part from an edge of an outer wall portion 11 on the vehicle front side to an outer edge of a front side wall portion 12 in the vehicle width direction is formed as a front thickened part 81, which is thicker than a plate thickness of the other part in the front side wall portion 12. Further, a part from an edge of the outer wall portion 11 on the vehicle rear side to an outer edge of a rear side wall portion 14 in the vehicle width direction is formed as a rear thickened part 82, which is thicker than a plate thickness of the other part in the rear side wall portion 14. The front thickened part 81 and the rear thickened part 82 can also provide an effect similar to the effect of the front ridge portion 11b and the rear ridge portion 11c in the above embodiment.

Further, for example, a boundary portion between the edge of the outer wall portion 11 on the vehicle front side and the outer edge of the front side wall portion 12 in the vehicle width direction, and a boundary portion between the edge of the outer wall portion 11 on the vehicle rear side to the outer edge of the rear side wall portion 14 in the vehicle width direction may be made of a material having a higher strength than the other parts.

The reinforcing portions in the embodiment and in the modifications may be combined. For example, while the front ridge portion 11b and the rear ridge portion 11c are provided in the outer wall portion 11, parts where the front ridge portion 11b and the rear ridge portion 11c are provided may be formed to have plate thicknesses thicker than the other parts.

Figure 9:
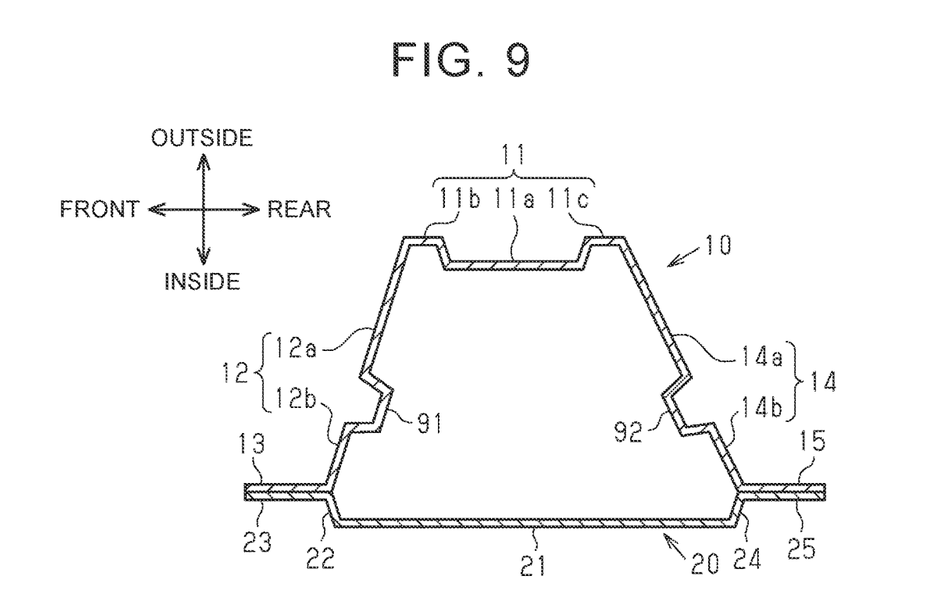
FIG. 9 is a sectional view of a vehicle side structure in a modification.

Other configurations may be employed without providing the bending regions (the edge line L1 and the edge line L2) in the front side wall portion 12 and the rear side wall portion 14. For example, in the example illustrated in FIG. 9, a front ridge portion 91 protecting rearward is provided between an outer portion 12a and an inner portion 12b in a front side wall portion 12. Further, a rear ridge portion 92 projecting forward is provided between an outer portion 14a and an inner portion 14b in a rear side wall portion 14. When the front ridge portion 91 and the rear ridge portion 92 are provided as such, sectional shapes of the front ridge portion 91 and the rear ridge portion 92 can hardly break. However, the front side wall portion 12 easily deforms to bend at a boundary line between the front ridge portion 91 and the outer portion 12a or a central part of the outer portion 12a in the vehicle width direction as a base point, so that a yield strength in this part might decrease.

The bending regions can be omitted in the front side wall portion 12 and the rear side wall portion 14. For example, in the example illustrated in FIG. 8, a load is easily applied in a concentrated manner to a boundary portion (an edge of the front thickened part 81) where the thickness changes in the front side wall portion 12, so a yield strength in this part is weaker than a part provided with the front thickened part 81. Accordingly, even if the front side wall portion 12 does not bend in the middle and the bending region is not provided therein, the yield strength in the boundary between the outer wall portion 11 and the front side wall portion 12 is higher than a yield strength in the front side wall portion 12. The same can be said about the rear side wall portion 14.

The reinforcing portions of the embodiment and the modifications may be provided in the boundary between the outer wall portion 11 and the front side wall portion 12 and the boundary between the outer wall portion 11 and the rear side wall portion 14. Further, the bending regions may be provided in the front side wall portion 12 or the rear side wall portion 14.

What is claimed is:

1. A vehicle side structure comprising:
   a pillar inner member provided so as to extend toward an upper portion of a vehicle in a vehicle up-down direction; and
   a pillar outer member placed opposite to an outer side of the pillar inner member the pillar outer member including
      an outer wall portion having a plate shape, opposed to the pillar inner member and provided so as to extend toward the upper portion of the vehicle in the vehicle up-down direction,
      a front side wall portion provided so as to extend inwardly in a vehicle width direction from an edge of the outer wall portion on a vehicle front side,
      a rear side wall portion provided so as to extend inwardly in the vehicle width direction from an edge of the outer wall portion on a vehicle rear side,
      a front flange portion provided so as to extend forward in a vehicle front-rear direction from an inner edge of the front side wall portion in the vehicle width direction and configured such that an inner surface of the front flange portion in the vehicle width direction is fixed to the pillar inner member, and
      a rear flange portion provided so as to extend rearward in the vehicle front-rear direction from an inner edge of the rear side wall portion in the vehicle width direction and configured such that an inner surface of the rear flange portion in the vehicle width direction is fixed to the pillar inner member,
      a hem portion in which the front side wall portion extends arcuately so as to be placed closer to a front side in the vehicle front-rear direction as it goes toward a lower side of the vehicle, and the rear side wall portion extends arcuately so as to be placed closer to a rear side in the vehicle front-rear direction as it goes toward the lower side, the hem portion being provided in a part of the pillar outer member on the lower side in the vehicle up-down direction,
   the pillar outer member includes at least one of
      a front reinforcing portion configured to reinforce a boundary between the outer wall portion and the front side wall portion, or
      a rear reinforcing portion configured to reinforce a boundary between the outer wall portion and the rear side wall portion, wherein:
   at least one of a condition (i) or a condition (ii) is satisfied
   (i) a yield strength of the boundary between the outer wall portion and the front side wall portion with respect to a lateral load applied to the outer wall portion at a right angle from outside in the vehicle width direction is higher than a yield strength of the front side wall portion with respect to the lateral load,
   (ii) a yield strength of the boundary between the outer wall portion and the rear side wall portion with respect to the lateral load is higher than a yield strength of the rear side wall portion with respect to the lateral load, and wherein:
   at least one of a condition (iii) or a condition (iv) is satisfied,
   (iii) the front side wall portion includes a bending region bending between the inner edge and an outer edge of the front side wall portion in the vehicle width direction, the bending region of the front side wall portion having a front outer portion placed on an outer side in the vehicle width direction relative to a first edge line of the bending region of the front side wall portion, a front inner portion placed on an inner side in the vehicle width direction relative to the first edge line, the first edge line is provided in the hem portion and the first edge line is provided between a center in the vehicle width direction and the inner edge of the front side wall portion, (iv) the rear side wall portion includes a bending region bending between the inner edge and an outer edge of the rear side wall portion in the vehicle width direction, the bending region of the rear side wall portion having a rear outer portion placed on the outer side in the vehicle width direction relative to a second edge line of the bending region of the rear side wall portion, a rear inner portion placed on the inner side in the vehicle width direction relative to the second edge line, the second edge line is provided in the hem portion and the second edge line is provided between the center in the vehicle width direction and the inner edge of the rear side wall portion.

2. The vehicle side structure according to claim 1, wherein both of the condition (i) and the condition (ii) are satisfied.

3. The vehicle side structure according to claim 1 wherein the pillar outer member includes the front reinforcing portion configured to reinforce the boundary between the outer wall portion and the front side wall portion, and the rear reinforcing portion configured to reinforce the boundary between the outer wall portion and the rear side wall portion.

4. The vehicle side structure according to claim 1, wherein the pillar outer member includes at least one of a front ridge portion, as the front reinforcing portion, projecting outwardly in the vehicle width direction relative to a flat portion placed in a central part of the outer wall portion in the vehicle front-rear direction and provided so as to extend along a front edge of the outer wall portion in the vehicle front-rear direction, or a rear ridge portion, as the rear reinforcing portion, projecting outwardly in the vehicle width direction relative to the flat portion and provided so as to extend along a rear edge of the outer wall portion in the vehicle front-rear direction.

5. The vehicle side structure according to claim 4, wherein the pillar outer member includes the front ridge portion as the front reinforcing portion, and the rear ridge portion as the rear reinforcing portion.

6. The vehicle side structure according to claim 1, wherein both of the condition (iii) and the condition (iv) are satisfied.

7. The vehicle side structure according to claim 1, wherein:

the front reinforcing portion and the rear reinforcing portion are provided in the hem portion in the vehicle up-down direction.

8. The vehicle side structure according to claim 1, wherein:

the first edge line is provided rearward of a boundary between the front side wall portion and the front flange portion in the vehicle front-rear direction; and the second edge line is provided frontward of a boundary between the rear side wall portion and the rear flange portion in the vehicle front-rear direction.

* * * * *

UNITED STATES PATENT AND TRADEMARK OFFICE
CERTIFICATE OF CORRECTION

PATENT NO. : 10,363,966 B2
APPLICATION NO. : 15/840231
DATED : July 30, 2019
INVENTOR(S) : Takahiro Ando and Hisashi Misawa It is certified that error appears in the above-identified patent and that said Letters Patent is hereby corrected as shown below:

On the Title Page

Item (57), abstract, Line 10, after "relative", delete "a" and insert --to--, therefor.

In the Specification

In Column 1, Line 8, after "incorporated", insert --herein--.

In Column 1, Line 38, after "2010/100717", insert --from outside--.

In Column 1, Line 40, after "which", insert --is--.

In Column 1, Line 66, after "vehicle", delete "from rear" and insert --front-rear--, therefor.

In Column 2, Line 11, after "with respect", delete "is" and insert --to--, therefor.

In Column 2, Line 20, after "outer wall", delete "pardon" and insert --portion--, therefor.

In Column 2, Line 22, delete "roar" and insert --rear--, therefor.

In Column 2, Line 23, after "having a", insert --high--.

In Column 3, Line 29, delete "that" and insert --flat--, therefor.

In Column 5, Line 32, delete "well" and insert --wall--, therefor.

In Column 6, Line 11, delete "die" and insert --the--, therefor.

In Column 6, Line 48, after "swings", delete "in" and insert --inwardly--, therefor.

Signed and Sealed this
First Day of October, 2019

Andrei Iancu
*Director of the United States Patent and Trademark Office*

CERTIFICATE OF CORRECTION (continued)
U.S. Pat. No. 10,363,966 B2

In Column 6, Line 63, after "along a", insert --line--.

In Column 9, Line 11, delete "11" and insert --H--, therefor.

In Column 10, Line 9, delete "11" and insert --H--, therefor.

In Column 10, Line 15, delete "font rear" and insert --front-rear--, therefor.

In Column 10, Line 26, delete "11a" and insert --11c--, therefor.

In Column 10, Line 57, delete "art" and insert --an--, therefor.

In Column 11, Line 2, after "H", insert --of--.

In Column 11, Line 51, delete "12" and insert --L2--, therefor.

In Column 12, Line 5, delete "11e" and insert --11c--, therefor.

In Column 12, Line 10, after "load", insert --is--.

In Column 12, Line 51, after "corner", delete "or" and insert --of--, therefor.

In Column 13, Line 60, delete "re strait" and insert --restrain--, therefor.

In Column 14, Line 14, delete "thrilled" and insert --formed--, therefor.

In Column 14, Line 22, after "11", insert --,--.

In Column 14, Line 57, delete "crashed" and insert --crushed--, therefor.

In Column 15, Line 54, delete "11." and insert --H.--, therefor.

In Column 16, Line 4, after "similarly", insert --,--.

In Column 16, Line 7, after "portion", insert --H--.

In Column 16, Line 41, after "Further", insert --,--.

In Column 16, Line 61, after "so", delete ",".